US012706567B2

(12) United States Patent
Singh et al.

(10) Patent No.: US 12,706,567 B2
(45) Date of Patent: Aug. 11, 2026

(54) SENSORS AND METHODS FOR MONITORING SOILING ON MONOFACIAL AND BIFACIAL PHOTOVOLTAIC PANELS

(71) Applicant: Campbell Scientific Inc., Logan, UT (US)

(72) Inventors: Ajay Singh, Logan, UT (US); James Richards, Shepshed (GB); Kris K. Payne, Paradise, UT (US); Mathew Ayres, Shepshed (GB); Troy Forbush, Smithfield, UT (US); David Jerrison, Shepshed (GB); Craig Christensen, Logan, UT (US); Josh Anderson, Logan, UT (US); Derek Jones, Nibley, UT (US); Todd Campbell, Logan, UT (US)

(73) Assignee: Campbell Scientific, Inc., Logan, UT (US)

( * ) Notice: Subject to any disclaimer, the term of this patent is extended or adjusted under 35 U.S.C. 154(b) by 360 days.

(21) Appl. No.: 18/506,713

(22) Filed: Nov. 10, 2023

(65) Prior Publication Data

US 2025/0158569 A1 May 15, 2025

(51) Int. Cl.
*H02S 50/15* (2014.01)

(52) U.S. Cl.
CPC .................................... *H02S 50/15* (2014.12)

(58) Field of Classification Search
CPC ........... H02S 50/15; H02S 50/10; Y02E 10/50
See application file for complete search history.

(56) References Cited

U.S. PATENT DOCUMENTS 10,447,201 B1 * 10/2019 Alzubi .................... H02S 50/10
10,615,745 B1 4/2020 Alasfour et al.
10,720,882 B2 7/2020 Tamizhmani et al.
2013/0159064 A1 * 6/2013 Fisher .................... G06Q 10/04 700/275
2017/0338771 A1 * 11/2017 Gostein ................... H02S 40/10
2018/0254741 A1 * 9/2018 Jones ........................ B08B 1/12
2018/0278202 A1 * 9/2018 Gostein ................... H02S 40/10

FOREIGN PATENT DOCUMENTS

WO 2023148353 A1 8/2023

OTHER PUBLICATIONS

Singh, et al., Measurement of Soiling Loss on Bifacial PV Modules, Campbell Scientific, Inc. 2021.

(Continued)

*Primary Examiner* — Huy Q Phan
*Assistant Examiner* — Haidong Zhang
(74) *Attorney, Agent, or Firm* — Dorsey & Whitney LLP

(57) ABSTRACT

Systems and methods for monitoring soiling of one or more photovoltaic (PV) modules. A sensor is provided that includes a measure chamber and a clean chamber. Cells in the measure chamber allow a measurement to be taken that accounts for soiling. Reference cells in the clean chamber can be exposed to incident light outside of the clean chamber. Measurements taken when the reference cells are outside of the clean chamber allow a clean output to be determined that is not subject to soiling. Comparing the output of the reference cell and the cells in the measure chamber allows a soiling loss to be determined.

20 Claims, 10 Drawing Sheets

(56) References Cited

OTHER PUBLICATIONS

8th World Conference on Photovoltaic Energy Conversion, WIP-Renewable Energie, Arbaretaz, et al., S. (2022). Quantifying the Energy Impact of Soiling Thanks to the Tool Soilratio. Solar RRL, ISBN: 978-3-936338-86-7.

International Search Report and Written Opinion for PCT/US2024/054986, mailed Mar. 4, 2025.

* cited by examiner

SENSORS AND METHODS FOR MONITORING SOILING ON MONOFACIAL AND BIFACIAL PHOTOVOLTAIC PANELS

FIELD OF THE INVENTION

Embodiments of the present invention generally relate to photovoltaic panels. More particularly, at least some embodiments of the invention relate to sensors, systems, hardware, software, computer-readable media, and methods for monitoring soiling of photovoltaic panels.

BACKGROUND

Photovoltaic panels ("PV" panels, "solar panels", or "PV modules") include photovoltaic cells that use sunlight as a source of energy to generate electricity, usually direct current electricity. Many factors affect the efficacy and efficiency of PV panels. One of the prominent factors that impacts the production of electricity from photovoltaic panels is soiling. Soiling refers to contaminants (e.g., dust, bird droppings, snow, and/or other contaminants) that are deposited over PV cells of a PV module over time. Soiling can prevent light from reaching PV cells for electricity generation, as well as cause other negative effects (e.g., staining, hot spots). These negative effects can impact the operation, efficiency, and output of the PV modules.

BRIEF DESCRIPTION OF THE DRAWINGS

In order to describe the manner in which advantages and features of embodiments of the invention can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF EMBODIMENTS OF THE INVENTION

Figure 1:
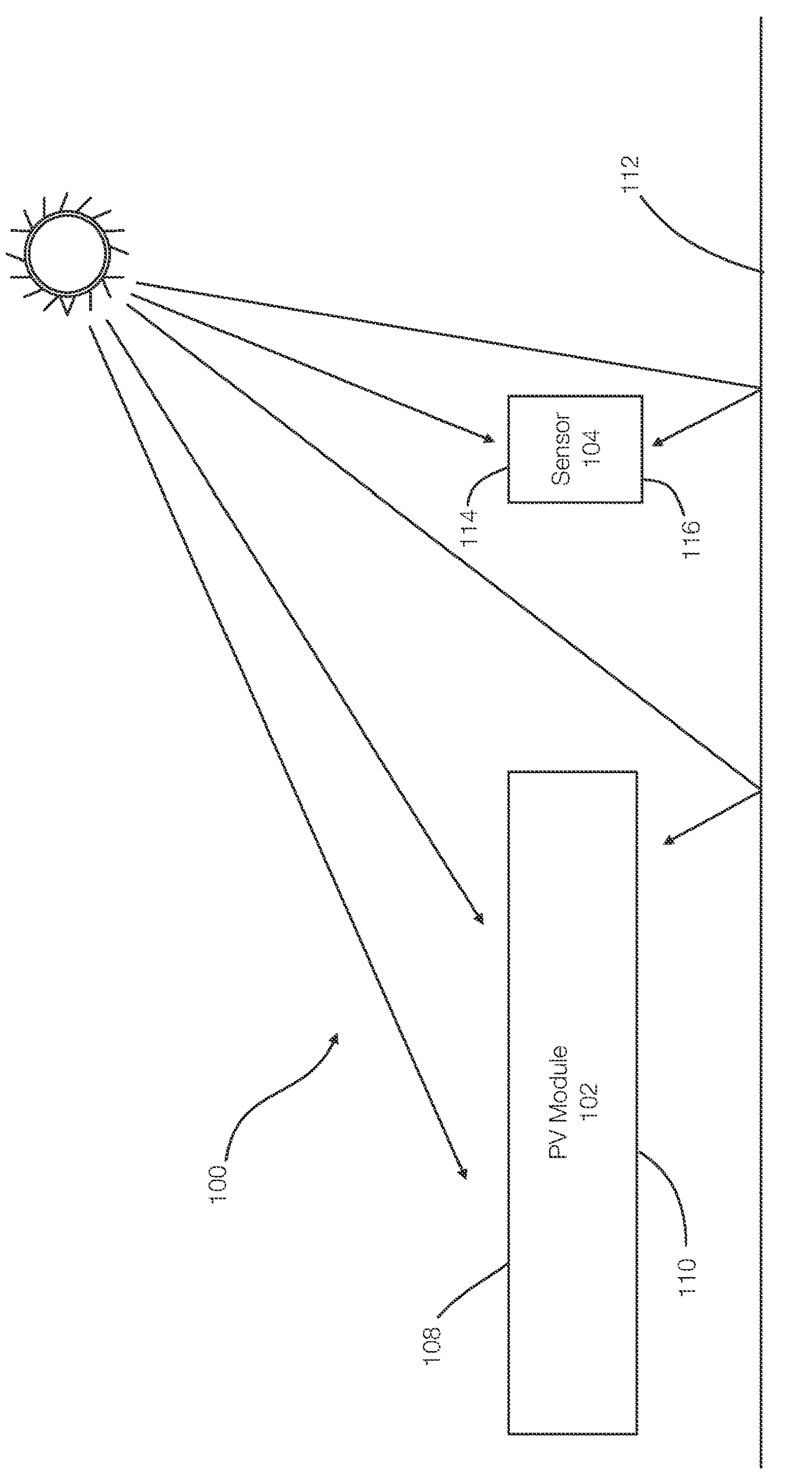
FIG. 1 discloses aspects of a photovoltaic module and a sensor configured to detect, measure, or infer soiling of the photovoltaic module.

Embodiments of the invention relate to sensors, systems, apparatus, and methods for monitoring photovoltaic panels. Embodiments of the invention relate to sensors, systems and methods for monitoring soiling on photovoltaic panels including at least monofacial and bifacial photovoltaic panels. Embodiments of the invention relate to various operations such as measuring or estimating soiling loss, generating alerts to perform cleaning operations based on the measured soiling loss, maintenance operations, or the like or combinations thereof.

An example method for measuring soiling loss on Bifacial PV modules is described in a publication entitled MEASUREMENT OF SOILING LOSS ON BIFACIAL PV MODULES published in 2021 IEEE 48th Photovoltaic Specialists Conference (PVSC), which publication is incorporated by reference in its entirety.

Soiling can be measured in different manners. In one example, the loss or soiling may be determined by comparing the outputs of two identical PV modules. This may minimize or reduce uncertainties due to spectral mismatch, type of soiling, temperature dependance, surface properties, or the like. This method includes comparing outputs (e.g., short circuit current or maximum power) from two PV devices or modules. The devices are mounted side-by-side and one needs to be maintained clean (the reference module) while the other is allowed to soil along with the production modules in the array.

Embodiments provides a clean reference measurement while avoiding the need for manual cleaning, by keeping the reference device in a dust free enclosure. The reference device is taken out periodically during the day for a quick measurement and then retracted back to the dust free enclosure. This is performed under the control of an electronic device.

The embodiment is also equipped with a bottom facing clean reference device that provides necessary signal for measuring soiling loss on the rear side of the bifacial panel.

The rear facing clean reference in embodiments of the invention relate to separating the contributions of the front and rear sides to the electrical output for a bifacial PV module. The method results in an estimation of a bifacial factor that may be specific to the local installation. The method also results in calculation of separate soiling losses for the front and rear surfaces by separating the module output from front and back side.

Soiling can be measured in terms of the PV devices or modules output. The output may be determined from a single PV module, a string of PV modules, or other collection of grouping of PV modules. Embodiments of the invention may measure soiling loss for the top surface and/or the back surface of a PV module. Embodiments of the invention may also measure incident and reflected light intensities. Embodiments of the invention further relate to a sensor configured to detect, measure and/or infer soiling loss on a single PV module, multiple PV modules, a string of PV modules, a PV plant for front surfaces of PV modules, and/or rear surfaces of PV modules.

FIG. 1 discloses aspects of a system in which soiling loss or soling rates are detected, measured, or inferred. Embodiments of the invention may determine soiling loss at specific points in time. The time series of data can be used to generate a soiling rate for front and/or rear surfaces of the PV modules.

FIG. 1 illustrates a system 100 that includes a PV module 102 and a sensor 104. The sensor 104 may be in close proximity to the PV modules producing electricity. The sensor and may be directly attached to the PV module 102. Multiple sensors may be attached to or associated with the PV module 102. In a PV plant or farm, each string or other grouping of PV modules may be associated with one or more sensors.

Placing the sensor 104 in this manner ensures that the sensor 104 experiences soiling that is close to the soiling experienced by the PV module 102. The sensor 104 may be placed at any of the sides of the PV module 102. In one example, multiple sensors 104 may be placed near to or be attached to the PV module 102. In one example, the sensor may include a front surface and a rear surface that are both configured to receive light.

When placing the sensor 104, the front and rear surfaces are often in the same orientation and/or planes as the front and rear surfaces of the PV module 102.

Figure 4:
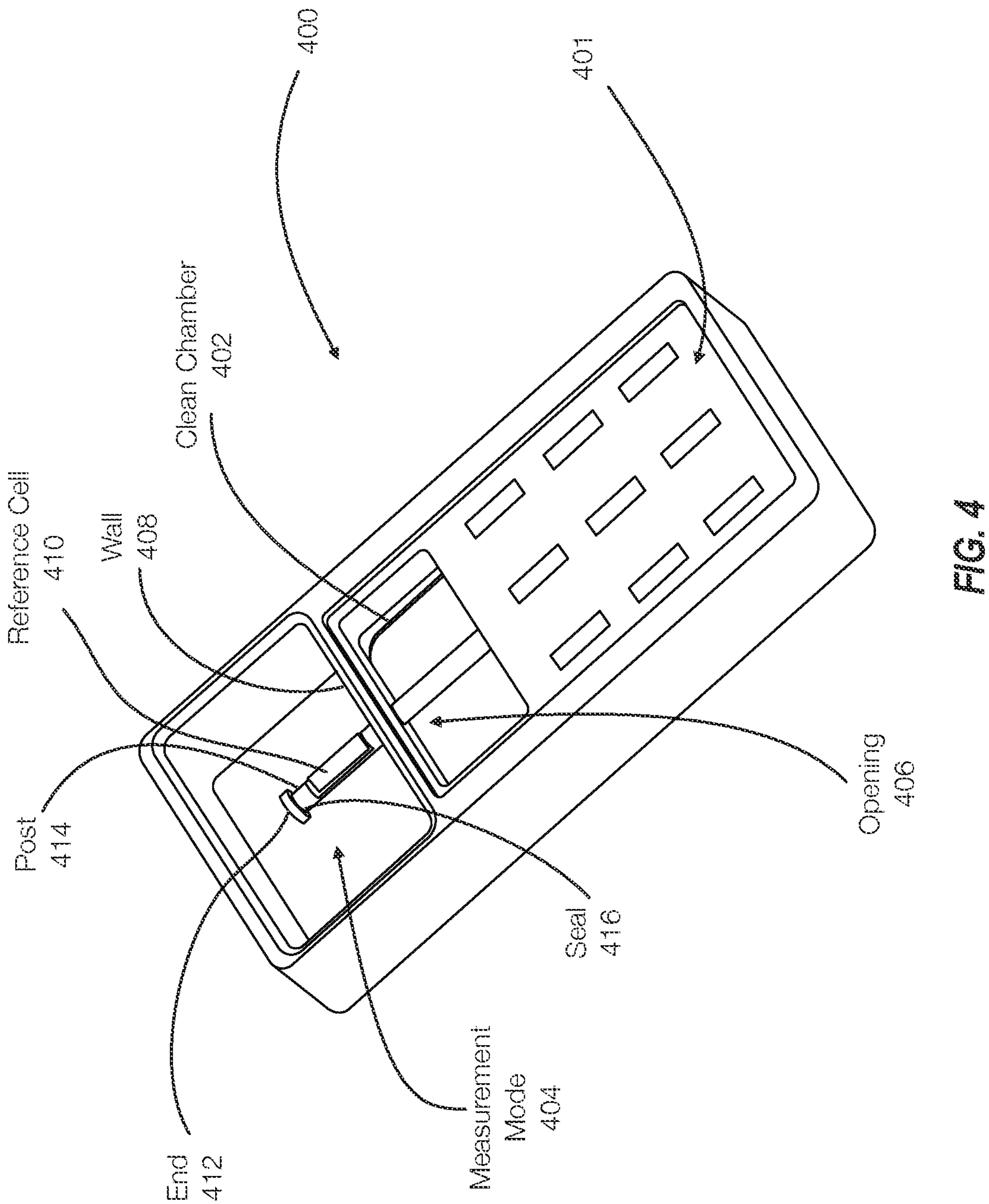
FIG. 4 discloses a perspective view of an example sensor.

An example of the sensor 104 is illustrated in FIG. 4 as the sensor 400. The sensor 400, discussed in more detail below, includes two components. The first component include a pair of identical PV devices: one facing up and the other facing down. This pair of PV modules is normally kept in a dust free enclosure and is attached to a movable mechanism. Periodically, this pair of PV devices can be exposed to sunlight to make a measurement. The second component may include a set of 9 (nine) PV devices arranged on a grid pattern and facing upward and one PV device facing downward. These devices collect dust naturally or are subject to soiling. Measurements from these soiled devices will be compared against the measurements from the clean PV devices and a soiling loss will be calculated.

In FIG. 1, the front surface 108 of the PV module 102 and a front surface 114 of the sensor 104 are irradiated by the sun. The front surface 108 and the rear surface 110 of the PV module 102 may each include a plurality of solar cells (or other PV devices or modules) configured to generate electricity from light or solar radiation. The rear surface 110 of the PV module 102 and the rear surface 116 of the sensor 104 are irradiated with reflected light. In this example, light is reflected by a reflector 112. The reflector 112 may be the ground or other reflector configured to better reflect light. The reflector may have a curved shape (e.g., parabolic), be flat, be formed of a reflective material, or the like.

Figure 2:
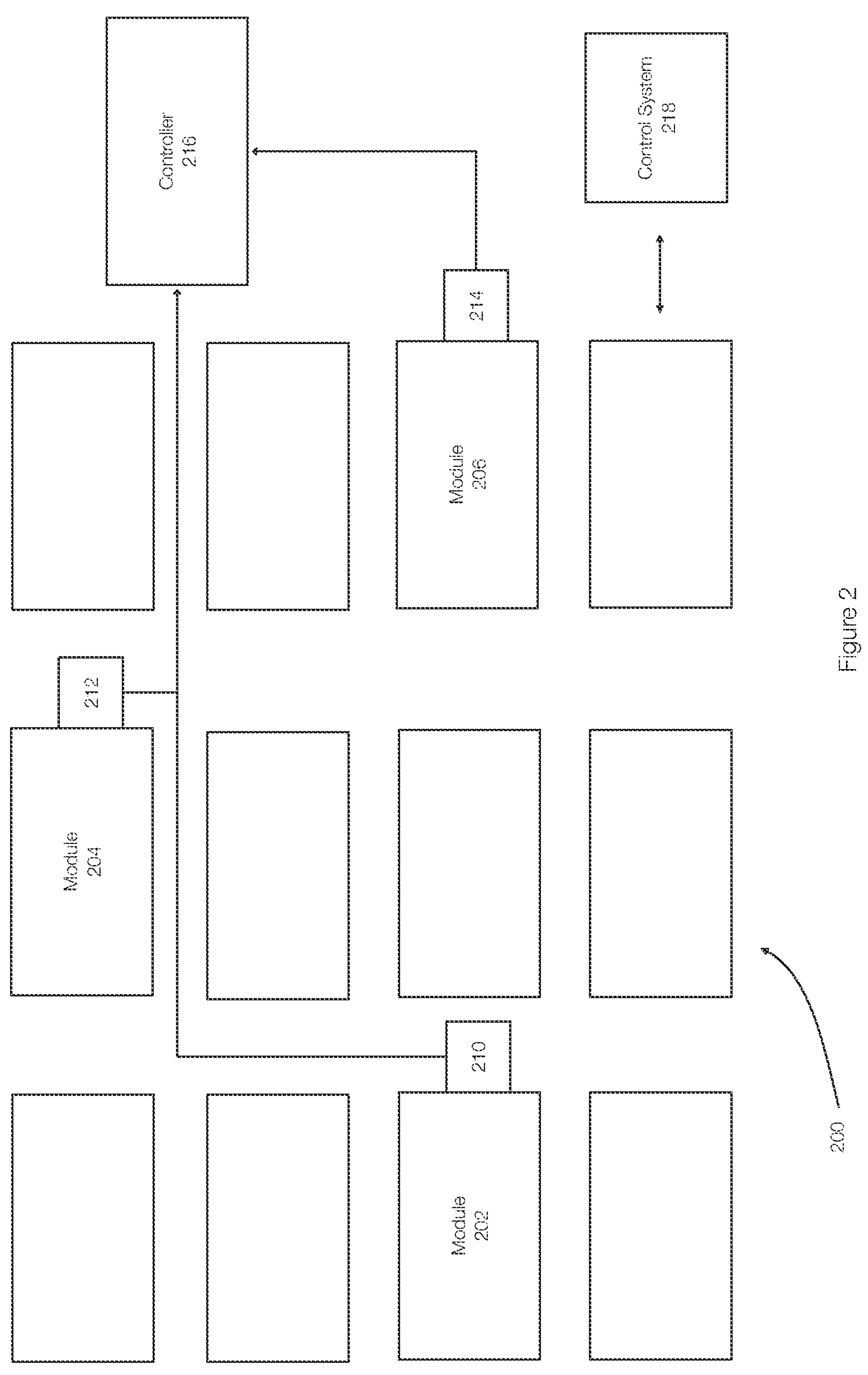
FIG. 2 discloses aspects of a PV module array and a system of sensors configured to monitor soiling of the array.

FIG. 2 discloses aspects of a solar panel array. The array 200 includes multiple PV modules that may be electrically connected. In this example, the PV modules 202, 204, and 214, are each associated with, respectively, a sensor 210, 212, and 214. The sensors 210, 212, and 214 can measure the soiling loss or soiling rates of the PV modules 202, 204, and 206. The soiling loss or rates of the other modules in the array 200 can be based on the nearest sensor, an average of the sensors 210, 212, and 214, or the like.

In FIG. 2, the sensors 210, 212, and 214 are connected to a controller 216 or computing system that may include processors, memory, and the like. The connection may be wireless and/or wired. Alternatively, data may be transmitted by the sensors periodically, according to a schedule, or the like. Thus, the sensors 210, 212, and 214 may include processing capabilities (processor or the like) and transmission capabilities (radio). The sensors 210, 212, and 214 may have sufficient computing to perform measurements and transmit the results, if necessary, to the controller 216 (or to the control system 218).

The controller 216 may also be configured to transmit data or information over a wired and/or wireless network. The sensors 210, 212, and 214 may be powered from the panels in the array 200 or from a separate power source. The controller 216 is also configured to start, stop and control measuring operations that may be performed at each of the sensors 210, 212, and 214. The array may also be associated with a control system 218 configured to control operations or the array, such as performing current and/or power measurements.

The information generated by the sensors 210, 212, 214 may be used in conjunction with data related to the modules in the array (e.g., short circuit current, total power) to determine a soiling loss. However, the soiling loss can be determined or estimated from the sensors alone in some embodiments. The soiling loss may be used to initiate a cleaning operation, generate an alert to an administrator, or the like.

Figure 3A:
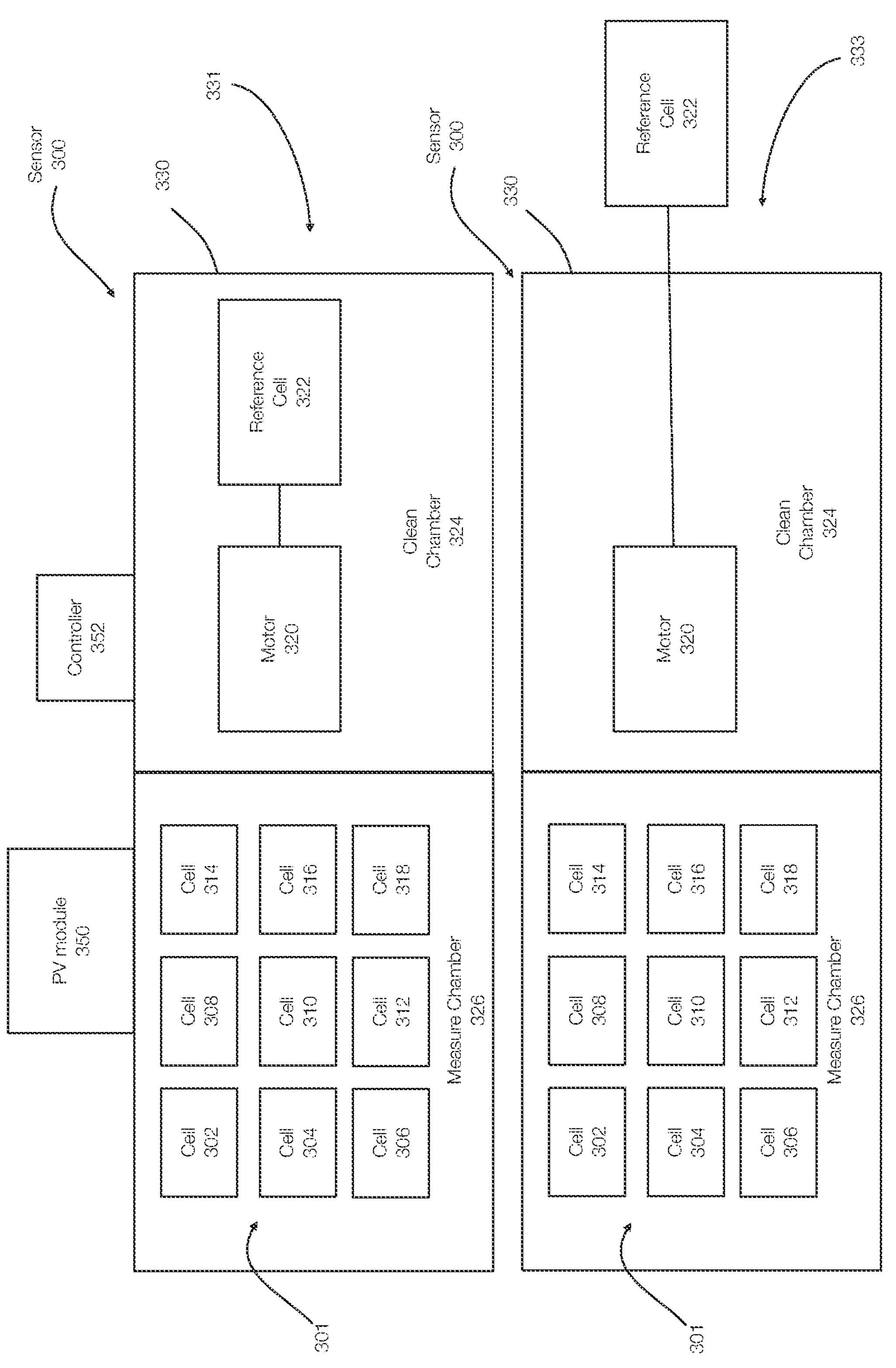
FIG. 3A discloses aspects of a sensor configured to detect, measure, and/or inform soiling of PV modules including bifacial PV modules.

FIG. 3A discloses aspects of a sensor and more specifically illustrates a top view of a sensor. FIG. 3A illustrates a top surface 330 (facing the sun or positioned similarly to a front surface of a PV module) of a sensor 300. The sensor 300 includes a measure component, such as a measure chamber 326 that may include an array of cells 302, 304, 306, 308, 310, 312, 314, 316, and 318 (collectively cells 301). The cells 301 (or top surface of the sensor 300) are subject to the same environmental conditions as the PV module 350 to which the sensor 300 is attached or which is nearby. Thus, the cells 301 (or top surface) likely experience the same or substantially similar soiling and soiling rates experienced by a top or front surface of the PV module 350.

The sensor 300 also includes a clean components, such as a clean chamber 324. The clean chamber 324 is separated from the measure chamber 326 and, in one embodiment, may be airtight, dust tight, and/or watertight. The clean component or chamber 324, in one embodiment, is configured to prevent the reference cell 322 from being soiled. This can be achieved even if the clean chamber 324 is not airtight when closed. Thus, when a measurement is performed using the reference cell 322, the reference cell is more likely to be clean or unsoiled. Protecting the reference cell 322 may help ensure that measurements performed using the reference cell 322 substantially correspond to measurements when initially deployed and clean. The clean chamber 324 may also contain a motor 320 and a reference cell 322, which may include one or more individual cells. The motor 320 is an example of a mechanism for moving the reference cell 322 from a first position to a measuring position and from the measuring position to the first position. The reference cell 322 is protected from soiling at the first position and is able to take measurements at the measurement position.

A controller, external or internal to the device (e.g., the sensor 330), such as the controller 216 (or a local controller such as the controller 352), may be configured to actuate the motor 320 or other movement mechanism to move the reference cell 322 from inside the clean chamber 324 to outside the clean chamber 324. Thus, the sensor 300 may operate in at least two modes including a rest mode 331 when the reference cell 322 is inside the clean chamber 324 and no measurements are being performed and a measurement mode 333 when the reference cell 332 is extended outside of the clean chamber 324 and measurements are performed. The controller 352 may be configured to initiate the measurement mode by moving the reference cell 322 outside of the clean chamber 324, perform measurements (measure the output of the reference cell 322), and return the reference cell 322 to the clean chamber. In the rest mode 331, the reference cell 322 is at the first position and the reference cell is positioned at a measurement position in the measurement mode 333.

Figure 3B:
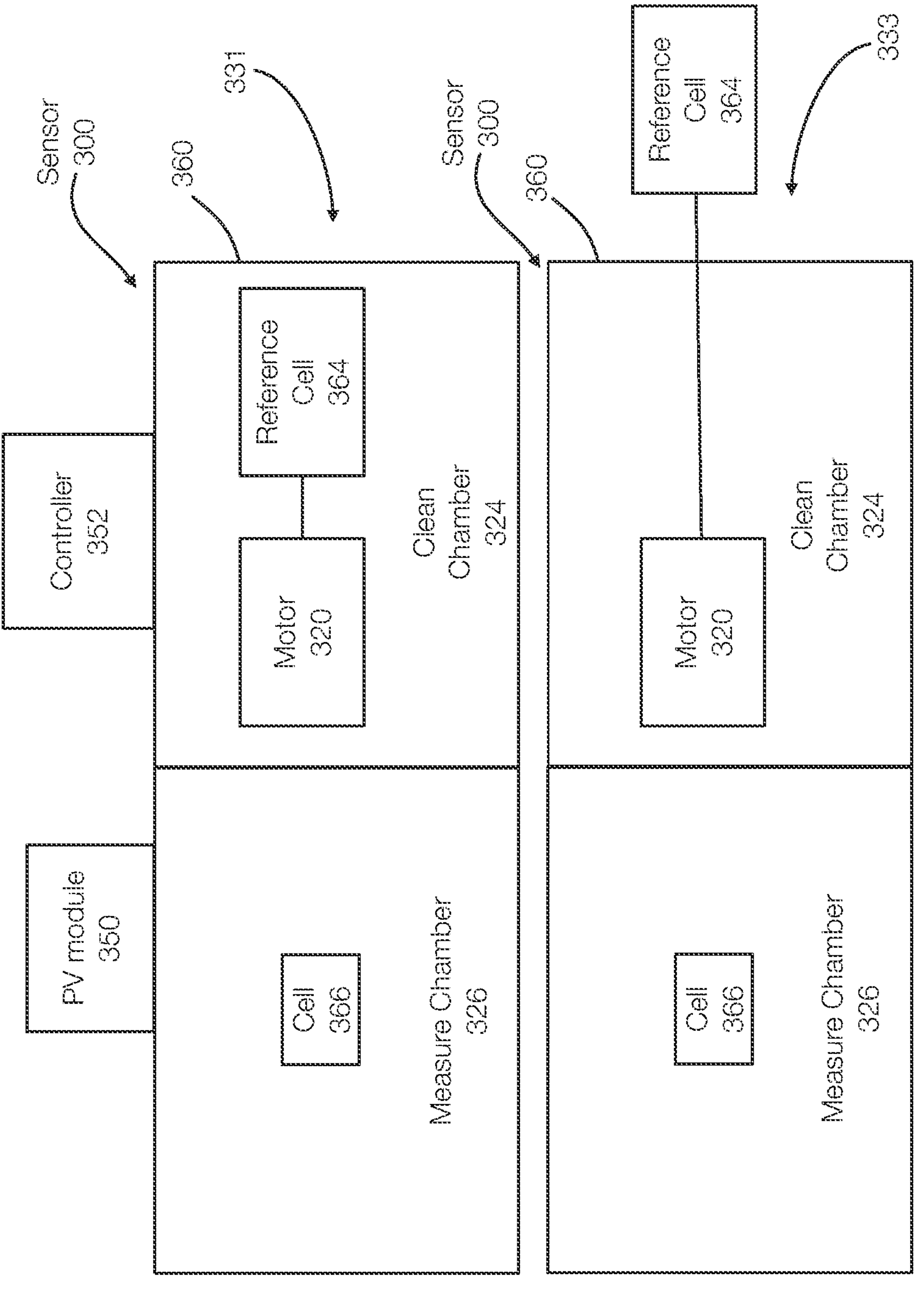
FIG. 3B discloses aspects of the sensor illustrated in FIG. 3A.

FIG. 3B discloses additional aspects of a sensor. More specifically, FIG. 3B illustrates a bottom view or the bottom surface 360 of the sensor 300 during the rest mode 331 and the measurement mode 333. In this example, the measure chamber 326 includes a cell 366, but may include multiple cells. The cell 366 is subject to the same or similar soiling experienced by the bottom surface of the PV module 350. In one example, the reference cell 364 receives light reflected from a reflector. In one example, the reference cell 364 and the reference cell 322 are integrated and move together, but they may move separately in other embodiments and be controlled independently.

Because the reference cells 322 and 364 are kept in the clean chamber 324 or protected from soiling except during the measurement mode 333 and because the reference cells 322 and 364 are moved outside of the clean chamber 324 during the measurement mode 333, the reference cells 322 and 364 are not subject to the soiling of the top and bottom surfaces of the sensor 300 when performing measurements. In effect, the measurement mode 333 allows the performance of the PV module 350 that has been subject to soiling to be measured against a cell (or cells) that has not been subject to the soiling. The reference cells 322 and 364 are clean and unsoiled or substantially clean and unsoiled when extended outside of the clean chamber 324.

The sensor 300 may be deployed with monofacial PV modules/systems or bifacial PV modules/systems and may also detect non-uniformity in soiling loss. The sensor 300 provides a clean reference cell that can be used independently to determine, by way of example, whether solar irradiance sensors or PV modules are soiled and need cleaning. In one example, a sensor configured specifically for a monofacial PV system may not include the sensors associated with the bottom side or surface of the sensor 300.

In one example, variations in the irradiances on the cells 301 may provide information on the non-uniform nature of soiling. The soiling loss may be calculated from a ratio of the signals from the cells 301 (collectively or individually) to the signal from the reference cell 322. The signals from the cells 301 may be averaged, weighted, or combined in another manner.

FIG. 4 discloses a perspective view of a sensor. The sensor 400 may be an example of the sensor 300. In this example, a front surface (configured to face the sun or in the same orientation as the front surface of a PV module) of the sensor 400 is illustrated. The measure chamber includes cells 401 that are subject to the same soiling as the associated PV module(s). FIG. 4 illustrates a clean chamber 402, which may be watertight, dust tight, and/or airtight (e.g., when closed) to protect the clean chamber 402 and the reference cell 410 from becoming soiled over time.

FIG. 4 illustrates that the sensor 400 is in the measurement mode 404. Thus, the reference cell 410 has been extended out of the clean chamber 402. In one example, the reference cell 410 is pushed through an opening 406 in a wall of the clean chamber 402. The opening 406 is configured to cooperate with an end 412 of a post 414 on which the reference cell 410 is mounted to make the clean chamber 402 airtight and/or watertight when the reference cell 410 is withdrawn into the clean chamber during the rest mode. In one example, the clean chamber 402 is configured to protect the reference cell 410 from being soiled. The opening 406 may include a door, a biased flap or other mechanism that can achieve the desired soiling protections. In one example, the clean chamber 402 or more specifically the reference cell 410 may be subject to soiling at a much lower rate that the cells 401 and the associated PV module.

In one example, the reference cell 410 may be mounted on the post 414 that has an end 412. In this example, the opening 406 and the post 414 may have similar shapes (e.g., both round or both square). If round, the diameter of the post 414 may be slightly smaller than a diameter of the opening 406 such that the post 414 can move or slide relative to the opening 406. The end 412 may include a seal 416 (e.g., a rubber ring) that is configured to press against a wall 408 of the clean chamber 402 when the sensor 400 is in the rest mode. This effectively seals the clean chamber 402 and protects the reference cell 410 from soiling when the reference cell 410 is retracted into the clean chamber 402. More specifically, the diameter of the end 412 or the seal 406 is larger than the diameter of the hole 406 such that a seal can be established. The seal 416 may be disposed on the wall 408.

Embodiments of the invention are discussed with respect to a bifacial PV module system, but can be adapted for use in a monofacial PV module system by optionally omitting acts, steps, and or elements related to measuring the radiation received at the rear surface of the module.

Figure 5:
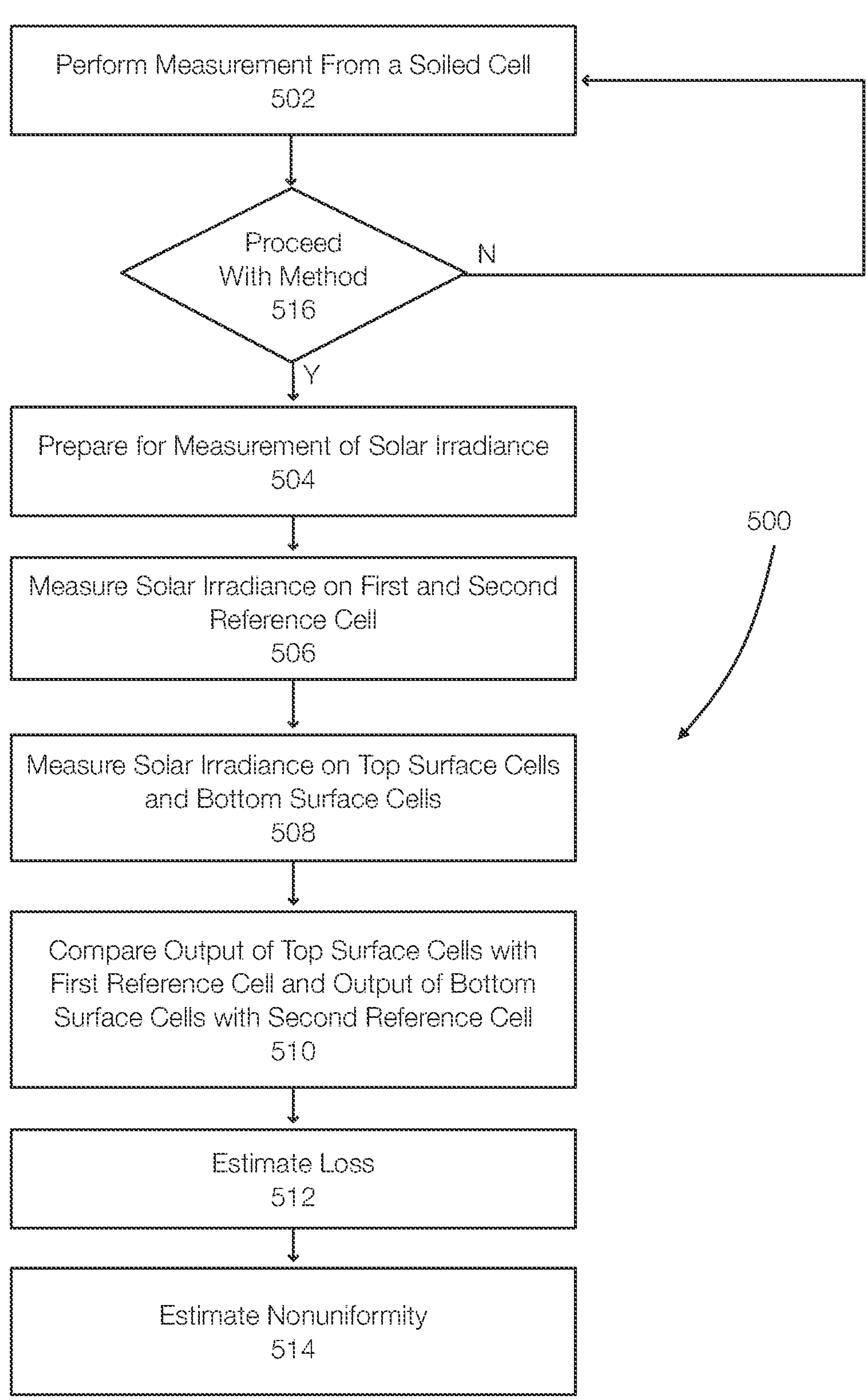
FIG. 5 discloses aspects of estimating soiling loss in a PV module or a PV system.

FIG. 5 discloses aspects of determining soiling loss. The method 500 is based on the sensor 300 or 400, which includes a grid of 9 cells in the measure chamber. However, a sensor may include more or fewer cells in the measure chamber and/or in the clean chamber. In the method 500, a measurement from or more of the soiled cells is performed 502 to determine if conditions are suitable to expose the clean reference without any risk of the clean reference getting wet or dirty or otherwise being soiled and/or to determine if there is enough sunlight to take measurements.

More specifically, the method 500 is performed to completion in suitable conditions such that the clean reference cell is not soiled when taking various measurements. As a result, measuring an output of one or more of the soiled cells, detecting current weather conditions, accessing weather data, or the like may be used to determine whether or not to proceed with the method 500. This may ensure that the clean reference cells are not soiled due to adverse conditions.

If the method 500 determines to wait (N at 516), the decision of whether to proceed with the method 500 may be revaluated at a later time, periodically, or the like. If the method 500 determines to proceed (Y at 516) The sensor may be placed in the measurement mode, which includes extending the reference cells outside of the clean chamber. When preparing 504 the sensor to perform a measurement, various actions may be performed such as ensuring that the sensor is actually extended. In other words, checks such as ensuring that the mechanism for extending the sensor is not jammed or ensuring that the sensor is not blocked or partially blocked, may be performed.

Once extended, solar irradiance or light may be measured 506 on a first reference cell and on a second reference cell. In this example, the first reference cell is upward facing or receives solar radiation directly while the second reference cell is positioned to received reflected solar radiation. In one example, the measurement includes, more specifically in one example, measuring an output (e.g., current or power) of the cells subject to soiling in the measure chamber and the output of the reference cell that has been protected from soiling.

Next, the solar irradiance on the cells in the measure chamber facing the top surface of the sensor and the solar irradiance on the cell(s) in the measure chamber facing the bottom surface are measured 508. The output of the top surface cells is compared 510 to the output of the first reference cell and the output of the bottom surface cell(s) is compared 510 to the output of the second reference cell. In one example, the output of the first reference cell can be compared to the output of each of the cells in the top surface of the sensor. This may allow variations in the irradiance to provide information on the non-uniform nature of the soiling.

With the outputs of the comparisons, the soiling loss can be estimated 512. The output may be measured in amps, watts, or the like. The nonuniformity may also be estimated 514 using individual comparisons. This may provide information that the soiling is prevalent in one predominant direction on the PV farm (e.g., North West, South West, top or bottom, etc.).

Once the measurements are performed, the sensor is returned to rest mode by retracting the reference cells back into the clean chamber.

Thus, the soiling loss is determined by comparing the current/power of the reference cell to the current/power of the cells in the measure chamber. Further, the order in which measurements is not specific. The measurement of the measurement cells may be performed before, after, or simultaneously with the measurement of the reference cells.

Figure 6:
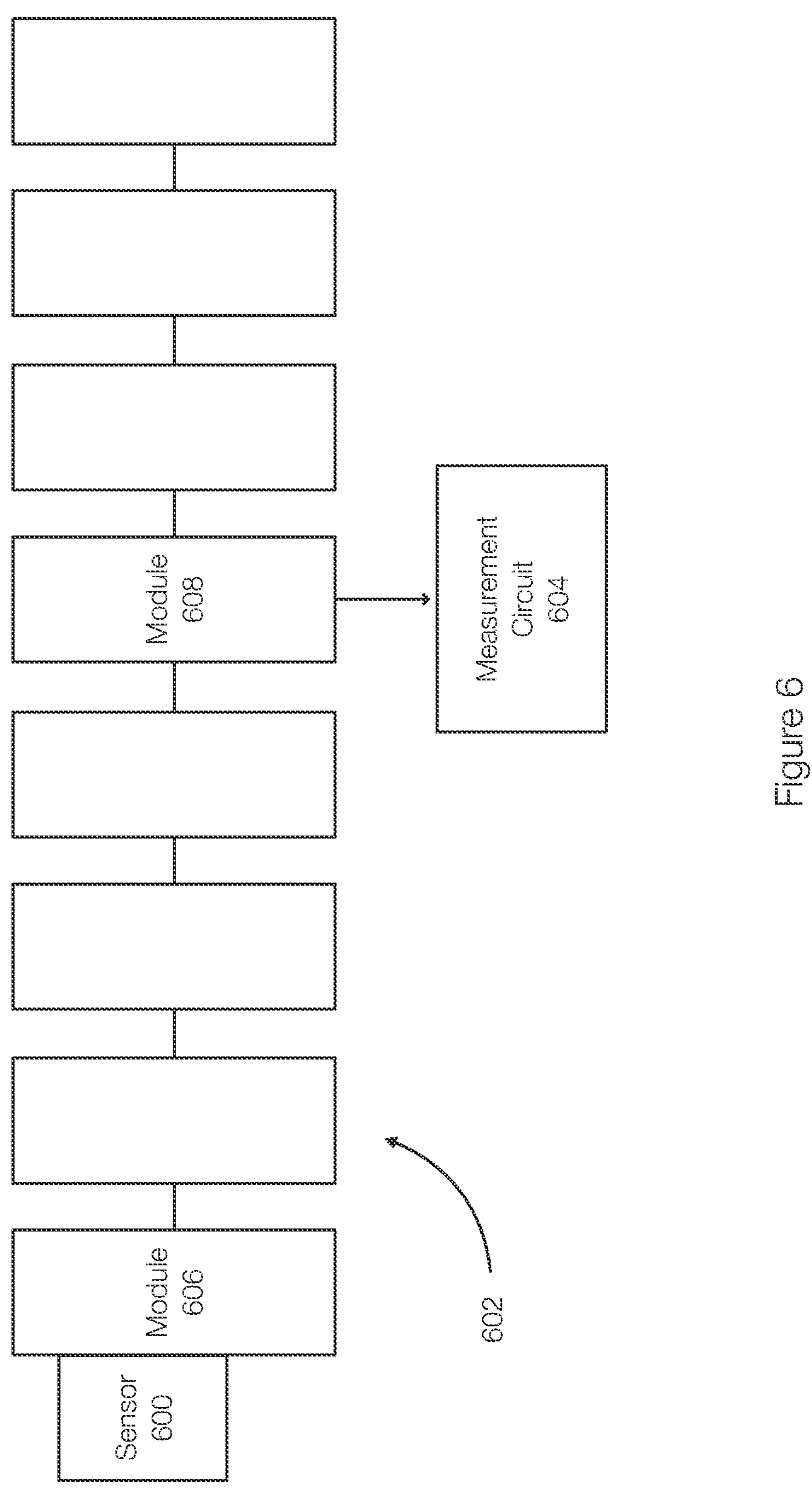
FIG. 6 discloses additional aspects of estimating soiling loss in a PV system.

FIG. 6 discloses additional aspects of measuring soiling loss in a PV module system. FIG. 6 illustrates a sensor 600 associated with a PV module 606 and with a string 602 of modules. The measurement circuit 604 is configured to disconnect one of the modules (e.g., the module 608) and measure a full IV curve of the single isolated module 608. The maximum power of the module 608 is then determined and the soiling loss is estimated by comparing the measured maximum power (or current) with the possible maximum power (or current) that could have been generated based on the clean reference measurement obtained from the sensor 600.

Figure 7:
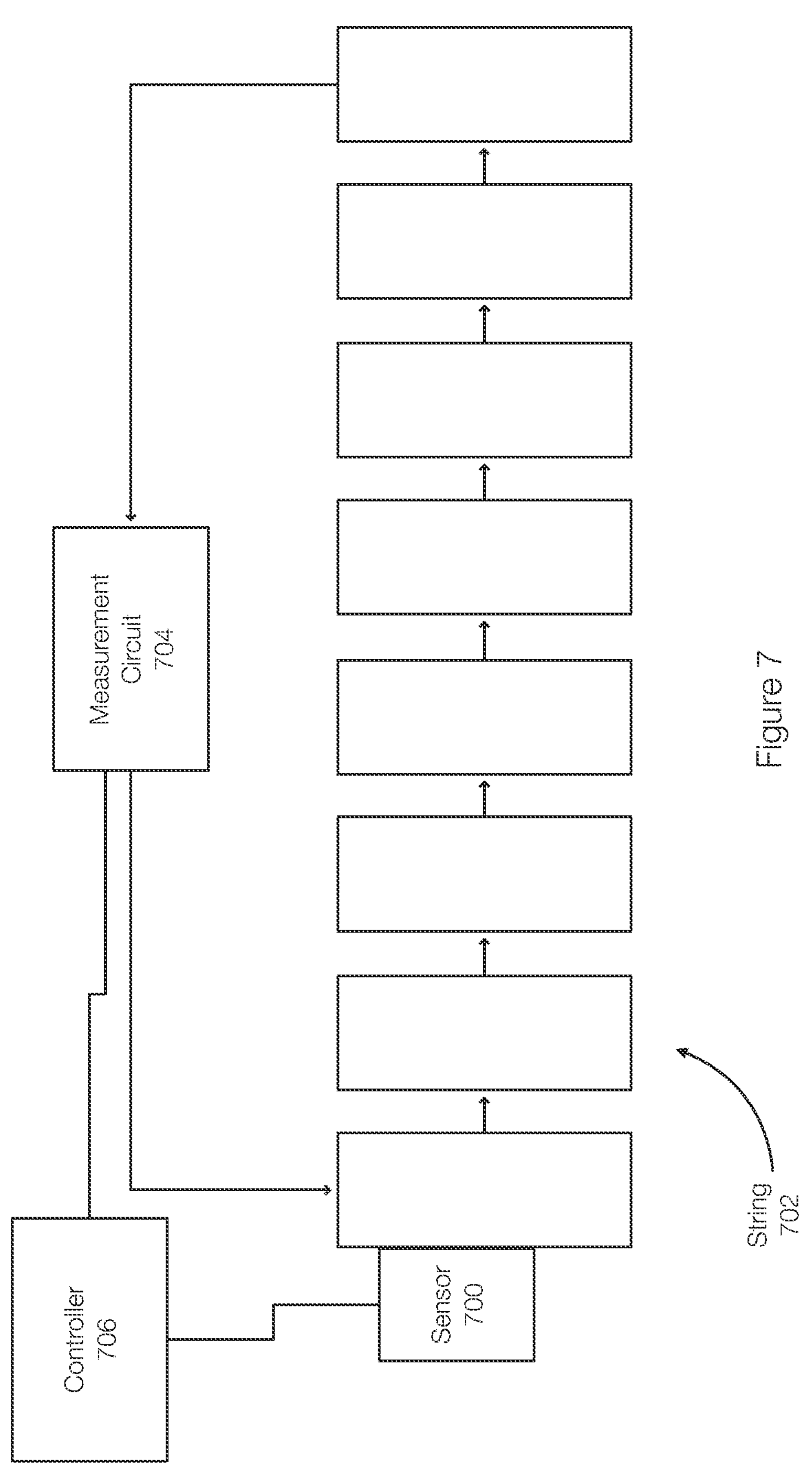
FIG. 7 discloses additional aspects of estimating soiling loss in a PV system.

FIG. 7 discloses additional aspects of measuring soiling loss in a PV system. In FIG. 7, a sensor 700 (or multiple sensors) is associated with a string 702 of PV modules. The sensor 700 may be associated with a measurement circuit 704. When the sensor 700 is placed in the measurement mode to obtain a measurement using a reference cell, the string 702 may be disconnected from an inverter such that a short circuit current generated by the string can be measured.

The measurement from the reference cell can be used to determine a short circuit current that should have been obtained had all of the modules in the string been clean. The soiling loss of the stream 702 can be determined based on the short circuit current of the string and the short circuit current of the reference cell.

The sensor, such as the sensor 300 is an example embodiment of the invention. The sensor, a measurement circuit, and/or a controller (processor, memory, etc.) may be an example embodiment of a system for determining a soiling loss of a PV module, a PV array or other PV system.

Figure 8:
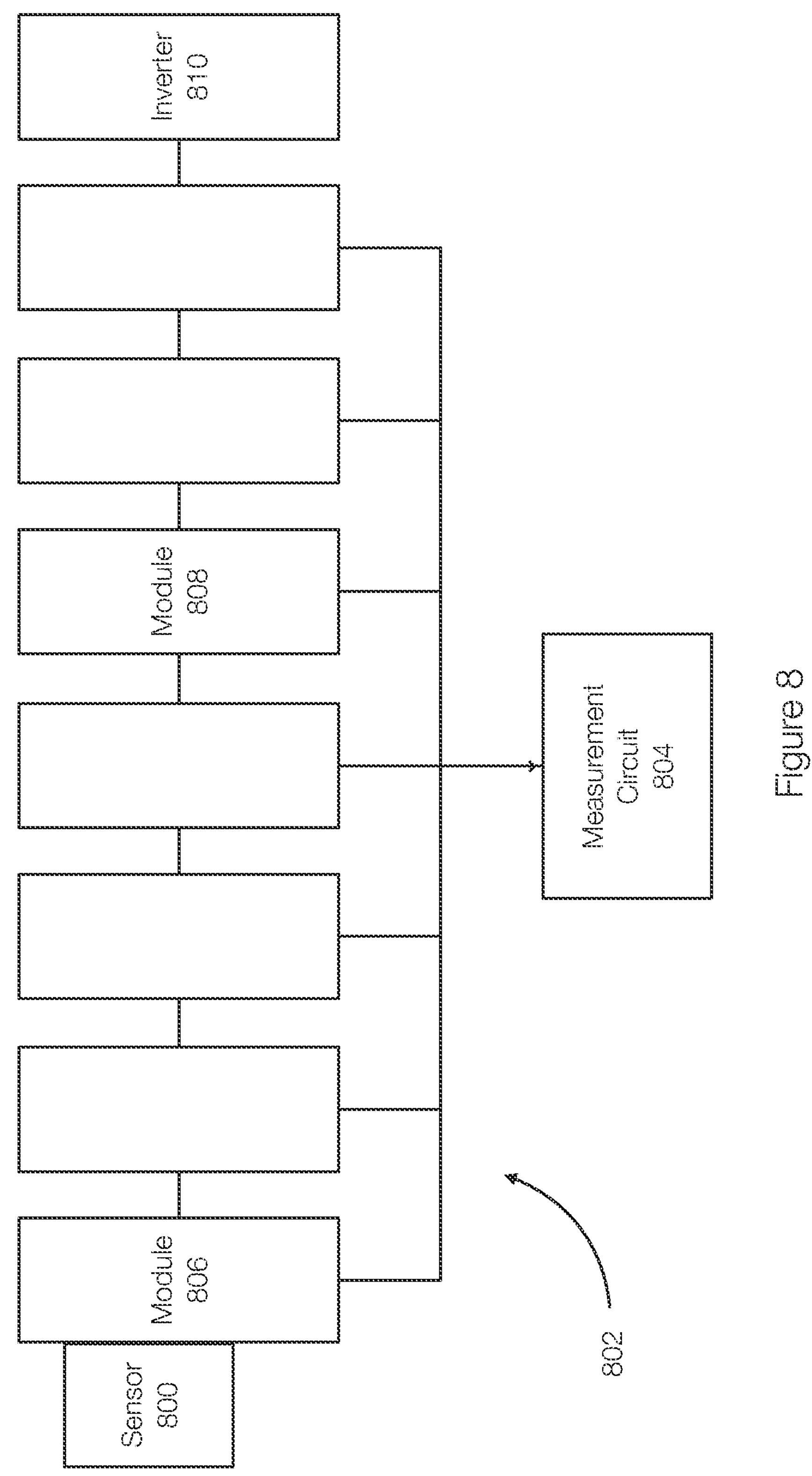
FIG. 8 discloses aspects of determining at least soiling loss using a module or panel from a string of modules.

FIG. 8 discloses additional aspects of determining soiling loss of a single PV module or of multiple PV modules. FIG. 8 illustrates a string 802 of connected modules. A solar farm may include multiple groups or strings of connected modules. The strings may also be connected as groups. In this example, a sensor 800 is attached to a module 806 of the string 802, although other modules may also be associated with a sensor.

A measurement circuit 804 is connected to the string 802. At various times, which may be predetermined, scheduled, or the like, one module or panel in the string 802 may be disconnected from the string 802. If the module 808 is disconnected from the string 802 for a short period of time (e.g., 0-5 seconds) and connected to the measurement circuit 804, a full IV curve of the isolated module 808 can be determined. The measurement circuit 804 may determine the maximum power that could have been generated using a measurement taken by the sensor 800. In other words, embodiments of the invention may determine a maximum power generated by the module 808 (which is less than in an unsoiled state) and determine a soiling loss by comparing the power generated by the module with the power that could have been generated based on the measurement of the sensor 800. This allows soiling loss to be based on the actual output of a specific panel in the string 802 compared to what the sensor indicates could have been generated absent soiling. If desired, cells in the measure chamber of the sensor (e.g., cells 301) can also be used in conjunction with the output of the module 808 to measure the soiling loss. In one example, a different module in the string 802 (e.g., the module 806) may be connected to the measurement circuit 804 to take a measurement for determining at least soiling loss. Thus, the connections to the measurement circuit 804 to the individual modules in the string 802 can be selectively connected. Further the string 802 may be configured such that all of the modules in the string 802 except the module used by the measurement circuit 804 are still connected to the inverter 810. In one embodiment, the sensor may only include a reference device because one of the modules is used rather than the devices 301.

Figure 9:
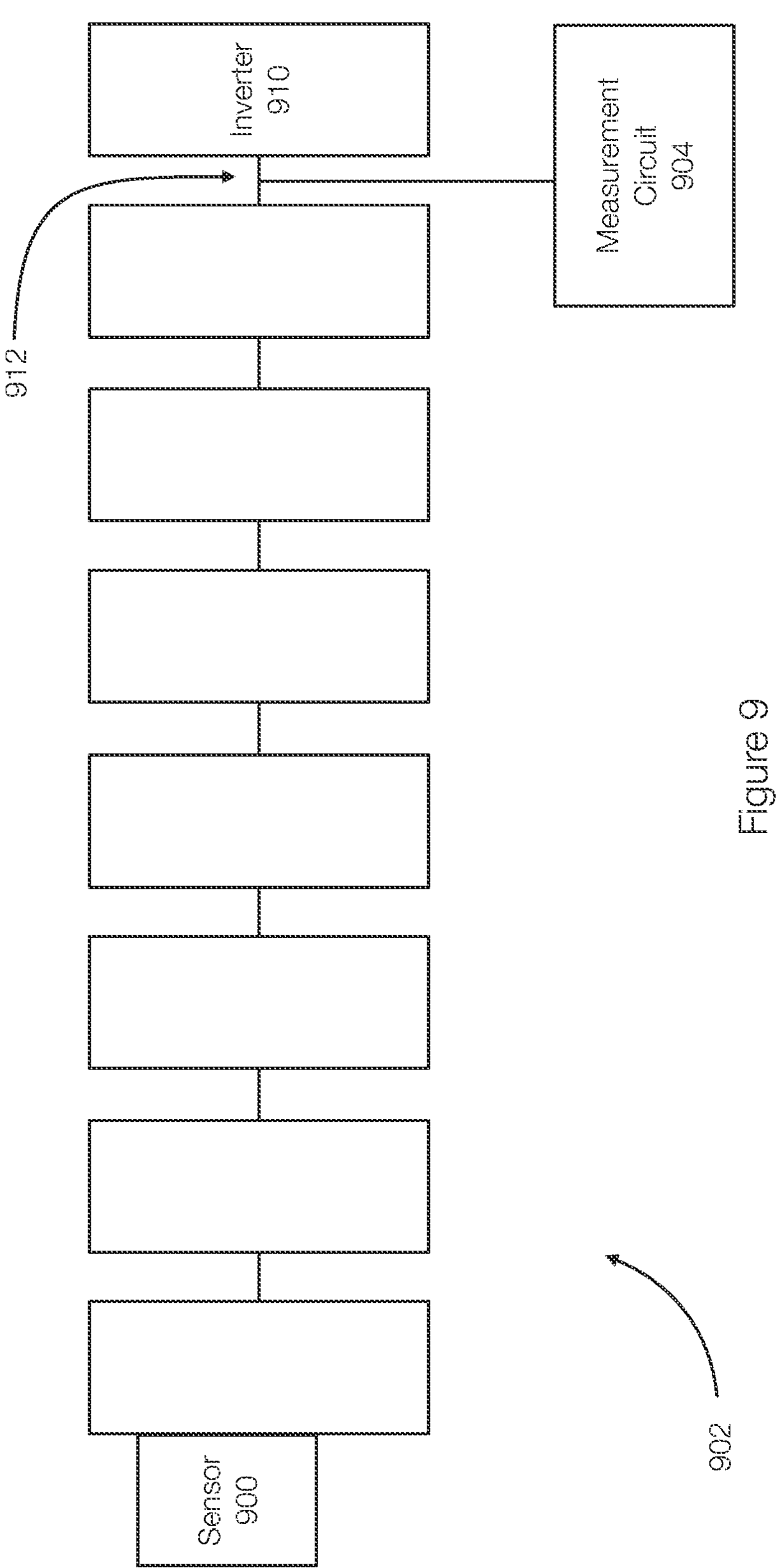
FIG. 9 discloses aspects of determining at least soiling loss based on a string of modules.

FIG. 9 discloses aspects of determining at least soiling loss based on a string of modules. FIG. 9 illustrates a string 902 of modules connected to an inverter 910 via a switch 912. In this example, the string 902 can be disconnected from the inverter 910 such that a short circuit current generated by the string 902 may be measured. A short circuit current generated by the sensor 900 is also measured. The short circuit current measured by the sensor 900 allows the short circuit current that, had the modules in the string 902 been clean, could have been generated to be determined. Comparing the short circuit current that could have been generated with the short circuit current measured by the measurement circuit 904 allows at least a soling loss for the entire string 902 to be determined.

It will be appreciated, in view of the present disclosure, embodiments of the present disclosure may implement, include, utilize, and/or operate in conjunction or communication with other components not explicitly illustrated or described hereinabove to facilitate monitoring of soiling for PV modules.

For example, a system for facilitating any of the disclosed embodiments may be implemented as or include one or more general-purpose or special purpose computing systems, which may take on a variety of forms. For instance, a system may include processor(s), storage, sensor(s), I/O system(s), communication system(s), and/or other additional or alternative components.

The processor(s) may include one or more sets of electronic circuitry that include any number of logic units, registers, and/or control units to facilitate the execution of computer-readable instructions (e.g., instructions that form a computer program). Such computer-readable instructions may be stored within storage. The storage may include physical system memory and may be volatile, non-volatile, or some combination thereof. Furthermore, storage may include local storage, remote storage (e.g., accessible via communication system(s) or otherwise), or some combination thereof. Additional details related to processors and computer storage media will be provided hereinafter.

Furthermore, in some instances, facilitating the disclosed embodiments may rely at least in part on I/O system(s). I/O system(s) may include any type of input or output device such as, by way of non-limiting example, a touch screen, a mouse, a keyboard, a controller, and/or others, without limitation.

Disclosed embodiments may include or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that merely carry computer-executable instructions without storing the computer-executable instructions are "transmission media." Thus, by way of example and not limitation, the current embodiments can include at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer-executable instructions include, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may include or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Alternatively, or in addition, the functionality described herein can be performed, at least in part, by one or more hardware logic components. For example, and without limitation, illustrative types of hardware logic components that can be used include Field-programmable Gate Arrays (FPGAs), application-specific integrated circuit (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A sensor for monitoring soiling of photovoltaic modules, the sensor comprising:

at least one measurement cell that is arranged to generate a measurement signal, wherein the at least one measurement cell is subject to soiling over time;

a first reference cell, wherein the first reference cell is arranged to receive at least incident radiation;

a controller;

wherein the controller is configured to transition the first reference cell from a protected state to a measurement state, to perform a measurement using the first reference cell, and to transition the first reference cell back to the protected state, wherein a soiling loss of a photovoltaic module associated with the sensor is determined based on an output of the first reference cell and an output of the at least one measurement cell; and a second reference cell, wherein the second reference cell is positioned near the first reference cell, wherein the second reference cell is transitioned between the protected state and the measurement state, and wherein the measurement state allows the first reference cell to receive incident radiation and allows the second reference cell to receive reflected radiation.

2. The sensor of claim 1, wherein the controller does not expose the first reference cell or perform the measurement using the first reference cell when an output of the at least one measurement cell indicates that the first reference cell should not be exposed or when external conditions would subject the first reference cell to soiling.

3. The sensor of claim 1, wherein the controller is configured to compare an output of each of the at least one measurement cell with the output of the first reference cell to determine information on a non-uniform nature of the soiling.

4. The sensor of claim 1, wherein the output of the at least one measurement cell and the output of the first reference cell is used to calculate the soiling loss based on a ratio of signals from each of the at least one measurement cell and a signal from the first reference cell.

5. The sensor of claim 1, further comprising a clean chamber, wherein the clean chamber is resistant to at least water and dust, and wherein the first reference cell is inside the clean chamber in the protected state.

6. The sensor of claim 5, wherein the at least one measurement cell comprises a second measurement cell, wherein the soiling loss of the photovoltaic module associated with the sensor is further determined based on an output of the second reference cell and an output of the second measurement cell.

7. The sensor of claim 5, wherein the clean chamber comprises a resealable opening, wherein the first reference cell and the second reference cell are transitioned from the protected state to the measurement state using the resealable opening to transition to the measurement state to operate in a measurement mode and to the clean chamber to operate in a rest mode, wherein the clean chamber is closed when the first and second reference cells are inside the clean chamber.

8. The sensor of claim 7, wherein the first reference cell and the second reference cell are configured to be in unison or independent when transitioned between the protected state and the measurement state.

9. The sensor of claim 1, wherein the first reference cell is used to determine a first soiling loss associated with a first surface of the photovoltaic module associated with the sensor and the second reference cell is used to determine a second soiling loss associated with a second surface of the photovoltaic module associated with the sensor.

10. A measurement system, comprising:
- a sensor associated with a string of photovoltaic modules, the sensor comprising:
  - a first reference cell, wherein the first reference cell is arranged to measure at least incident radiation;
  - a clean chamber;
  - a controller, wherein the controller is configured to transition the first reference cell from a first position relative to the clean chamber where the first reference cell is protected from soiling to a measurement position relative to the clean chamber where the first reference cell is exposed to incident light, to perform a measurement using the first reference cell, and to transition the first reference cell back to the first position relative to the clean chamber;
  - a second reference cell configured to receive reflected light and positioned near the first reference cell, wherein the second reference cell is transitioned relative to the clean chamber between the first position and the measurement position,
- wherein the measurement position allows the second reference cell to receive the reflected light;
- a measurement circuit, wherein the measurement circuit is configured to measure a power of a selected photovoltaic module within the string of photovoltaic modules,
- wherein the controller is configured to determine a soiling loss associated with the selected photovoltaic module by:
  - determining a maximum power that could have been generated by the selected photovoltaic module based on an output of the first reference cell; and
  - comparing the power of the selected photovoltaic module with the maximum power to determine the soiling loss of the selected photovoltaic module.

11. The measurement system of claim 10, wherein the clean chamber is resistant to at least water and dust, and wherein the first position relative to the clean chamber is inside the clean chamber.

12. The measurement system of claim 10, wherein the controller is further configured to determine a second soiling loss associated with a second selected photovoltaic module of the string of photovoltaic modules by:
- determining a second maximum power that could have been generated by the second selected photovoltaic module based on an output of the second reference cell; and
- comparing the power of the second selected photovoltaic module with the second maximum power that could have been generated by the second selected photovoltaic module to determine the soiling loss of the second selected photovoltaic module.

13. The sensor of claim 10, wherein the clean chamber comprises a resealable opening, wherein the first reference cell and the second reference cell are transitioned from the first position in a protected state to the measurement position in an exposed state using the resealable opening to operate in a measurement mode and are transitioned to the clean chamber to operate in a rest mode, wherein the clean chamber is closed when the first and second reference cells are inside the clean chamber.

14. The measurement system of claim 13, wherein exposure of the first reference cell and the second reference cell are configured to be in unison or independent.

15. The measurement system of claim 10, wherein the first reference cell is used to determine a first soiling loss associated with a first surface of the selected photovoltaic module and the second reference cell is used to determine a second soiling loss associated with a second surface of the selected photovoltaic module.

16. A measurement system comprising:
- a sensor associated with a string of photovoltaic modules, the sensor comprising:
  - a first reference cell, wherein the first reference cell is arranged to measure at least incident radiation;
  - a first controller;
  - a mechanism wherein the first controller is configured to transition the first reference cell between a first state where the first reference cell is protected from soiling and a measurement state where the first reference cell is exposed to incident light, to perform a measurement using the first reference cell, and to transition the first reference cell back to the first state; and
  - a second reference cell configured to receive reflected light, wherein the second reference cell is positioned near the first reference cell, wherein the second reference cell is transitioned by the mechanism between the first state and the measurement state;
  - wherein the measurement state allows the first reference cell to receive incident light and allows the second reference cell to receive the reflected light;
- a measurement circuit, wherein the measurement circuit is configured to measure a measured short circuit current of the string of photovoltaic modules that have been disconnected from an inverter; and
- a second controller configured to determine a soiling loss associated with the string of photovoltaic modules by:
  - determining a short circuit current that could have been generated by the string of photovoltaic modules based on an output of the first reference cell; and
  - comparing the short circuit current of the string of photovoltaic modules with a maximum short circuit current based on the output of the first reference cell.

17. The measurement system of claim 16, wherein the sensor further comprises a clean chamber, wherein the clean chamber is resistant to at least water and dust and wherein the first state is inside the clean chamber.

18. The measurement system of claim 16, wherein the second controller is further configured to determine the soiling loss associated with the string of photovoltaic modules by comparing the short circuit current of the string of photovoltaic modules with a second maximum short circuit current based on an output of the second reference cell.

19. The sensor of claim 17, wherein the clean chamber comprises a resealable opening, wherein the first reference cell and the second reference cell are transitioned from a protected state to an exposed state using the resealable opening to transition to the measurement state to operate in a measurement mode and to the clean chamber to operate in a rest mode, wherein the clean chamber is closed when the first and second reference cells are inside the clean chamber.

20. The measurement system of claim 16, wherein transitions of the first reference cell and the second reference cell are configured to be in unison or independent, wherein the first reference cell is used to determine a first soiling loss associated with first surfaces of the string of photovoltaic modules and the second reference cell is used to determine a second soiling loss associated with second surfaces of the string of photovoltaic modules.

* * * * *